(12) United States Patent
Sawai et al.

(10) Patent No.: US 6,595,533 B2
(45) Date of Patent: Jul. 22, 2003

(54) REINFORCING MEMBER FOR VEHICLES AND VEHICLE BODY STRUCTURE

(75) Inventors: Seiji Sawai, Iwata (JP); Kouji Sakai, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/682,992

(22) Filed: Nov. 6, 2001

(65) Prior Publication Data

US 2002/0056969 A1 May 16, 2002

(30) Foreign Application Priority Data

Nov. 15, 2000 (JP) ........................ 2000-347574
Aug. 20, 2001 (JP) ........................ 2001-248871

(51) Int. Cl.[7] .................... B60G 13/02; B62D 25/08
(52) U.S. Cl. .................. 280/124.108; 280/124.155; 296/194; 296/195
(58) Field of Search ................ 280/781, 784, 280/788, 124.147, 124.155, 124.108; 296/188, 194, 203.02, 195, 203.04

(56) References Cited

U.S. PATENT DOCUMENTS 6,140,720 A * 10/2000 Certain ..................... 310/64
6,206,460 B1 * 3/2001 Seeliger et al. ......... 296/203.02

FOREIGN PATENT DOCUMENTS

| JP | 403239613 A | * 10/1991 | .............. 280/781 |
| JP | 405319307 A | * 12/1993 | .............. 296/194 |
| JP | 11198853 A | * 7/1999 | |

* cited by examiner

Primary Examiner—Peter C. English
(74) Attorney, Agent, or Firm—Ernest A. Beutler

(57) ABSTRACT

A number of embodiments of reinforcing arrangements for vehicle bodies wherein the suspension forces for the ground engaging element are transmitted to the vehicle body and reinforcement is provided in this area. Rather than providing rigid reinforcement, as with the prior art, various forms of damping arrangements are disclosed including those which permit different damping in one direction from the other and utilizing either elastic or hydraulic viscous type dampers.

13 Claims, 19 Drawing Sheets

REINFORCING MEMBER FOR VEHICLES AND VEHICLE BODY STRUCTURE

BACKGROUND OF INVENTION

This invention relates to a reinforcing member for vehicles and vehicle body structures and more particularly to an improved reinforcing arrangement for the vehicle suspension components for suspending the ground engaging element of the vehicle upon the vehicle body structure.

It is well known in vehicle structure that the vehicle has a body which may include a separate frame or which frame may be formed semi-integrally with the body. Ground engaging elements are suspended from the vehicle body by a suspension system so as to provide a smooth and compliant ride as the vehicle travels along the terrain that it traverses. One type of vehicle suspension system is the so called "strut type" in which the suspension includes a pillar or strut that is mounted on an upper portion of the body frame and which is telescopic to permit the movement of the ground engaging member.

It has been the practice to provide some form of body rigidifying structure adjacent the point of the vehicle body where this strut is connected. This is particularly true in frameless vehicles and one embodiment of this type of prior art construction is shown in FIG. 1 wherein the prior art vehicle body is indicated generally by the reference numeral 21 and which has an engine compartment 22 that is defined in part by means of a pair of fender skirts 23. The upper ends of the suspension unit for the wheels is connected adjacent these fender skirts 23. A pair of reinforcing bars 24 are interconnected at one end to the fender skirts 23 and at the other end to another part of the vehicle body to provide a rigidifying arrangement for the structure.

FIG. 2 illustrates another type of prior art reinforcing structure for a vehicle, indicated in this instance by the reference numeral 25 and which is shown from the underside. Adjacent the mounting of the suspension arms, there is provided a reinforcing frame element 26 that is interconnected between the frame rails 27 of the vehicle body and a front cross member 28.

Although these types of structures provide a rigid base for the vehicle body in the area of the suspension unit, the rigidity of these elements causes elastic deformation upon the application of a load which when the load is removed, applies a reverse force back on the vehicle body at the point of attachment. Therefore, this causes vibrations and stress concentrations on the connection that can in fact deteriorate the performance and in fact can give rise to deterioration in the drivability and the ride of the vehicle.

It is, therefore, a principle object to this invention to provide an improved vehicle body structure and reinforcing arrangement for association with the vehicle ground engaging element suspension of the vehicle.

It is a further object of this invention to provide an improved rigidifying structure for a vehicle body that will provide sufficient rigidity but also which will avoid the inducement of vibrations and stress concentrations in the attached structure.

SUMMARY OF INVENTION

This invention is adapted to be embodied in a vehicle having a vehicle body assembly. A ground-engaging element is providing for engaging the surface along which the vehicle passes. A suspension system suspends the ground-engaging element for suspension travel relative to the body assembly. A reinforcing member is attached at one end to a reinforcing part of the vehicle body to which the suspension system is affixed to receive forces transmitted to the reinforcing part. Another end of the reinforcing member is attached to another part of the body assembly and to which a generally axial force is applied from the suspension system through the reinforcing member. A damping system is provided for generating a damping force against the generally axial force on the reinforcing member.

DETAILED DESCRIPTION

Figure 1:
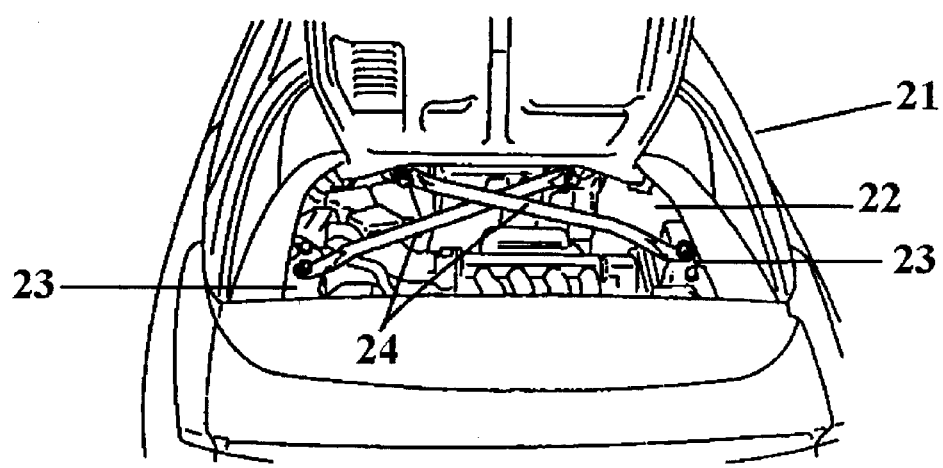
FIG. 1 is a top plan view looking into the engine compartment of a motor vehicle constructed in accordance with a first type of prior art construction.
Figure 2:
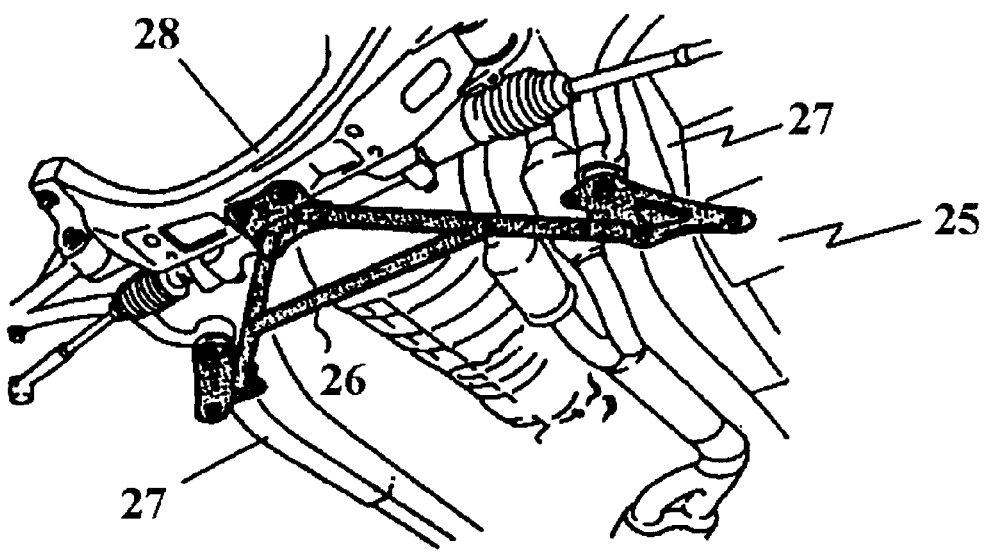
FIG. 2 is a partial perspective view taken from below of another type of prior art vehicle"s construction.
Figure 3:
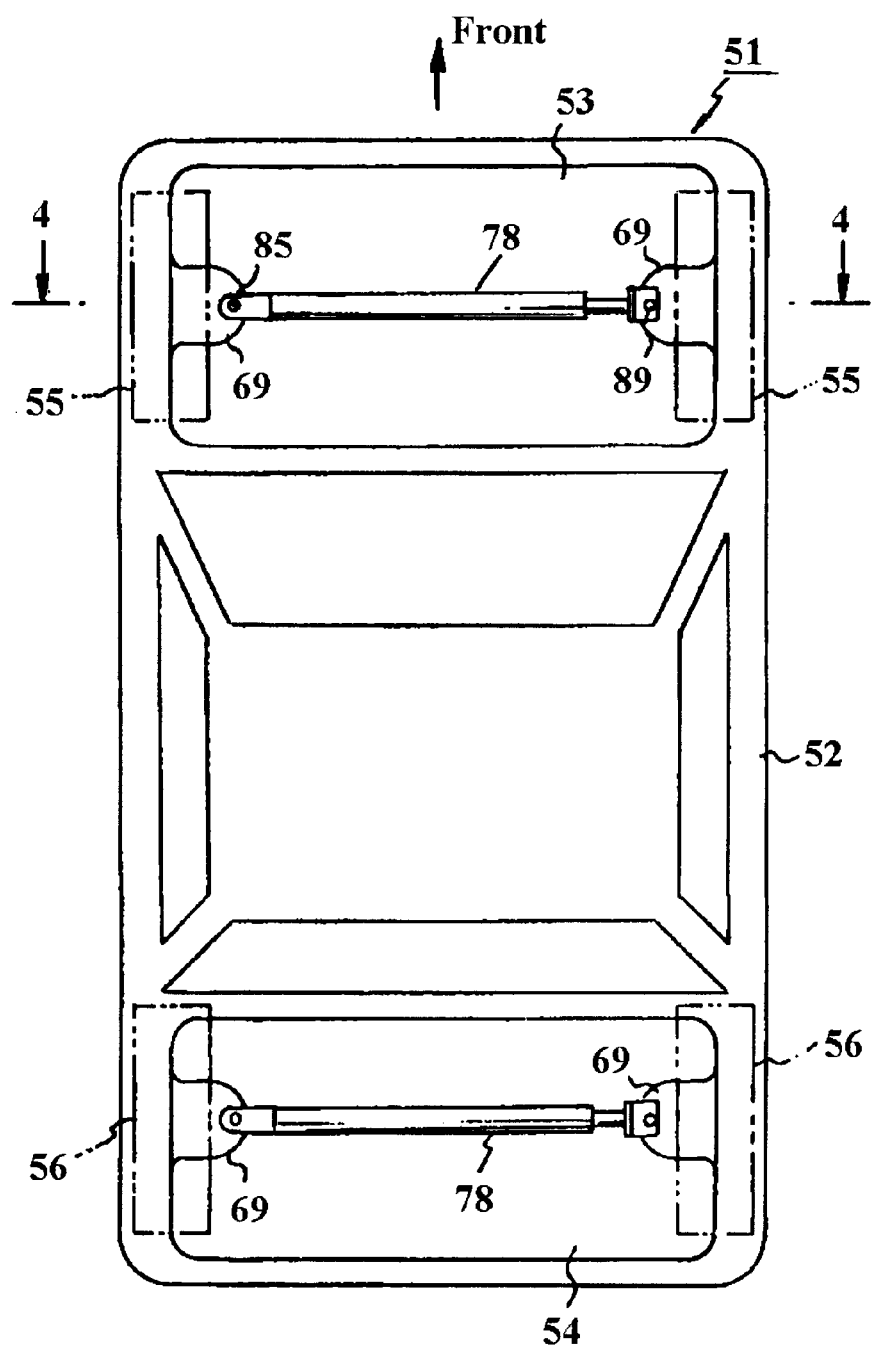
FIG. 3 is a partially schematic top plan view showing the front and rear suspension units and reinforcing arrangements of a vehicle constructed in accordance with a first embodiment of the invention.

Referring first to FIG. 3, a motor vehicle constructed in accordance with the invention is shown generally schematically although certain components of the vehicle are shown in fuller detail in the remaining figures relating to this embodiment. The motor vehicle, indicated generally by the reference numeral 51, is comprised of a unitary body frame assembly 52 which defines at the front portion thereof an engine compartment 53 and at the rear portion thereof a trunk compartment 54.

A pair of front wheels 55 are journalled for suspension movement relative to the body 52 in a manner, which will be described shortly. In a like manner, a pair of rear wheels 56 are journalled at the rear end of the body by means of a suspension system that can be substantially the same as the suspension system associated with the front wheels. As should be apparent from the foregoing description, the suspension systems for suspending the wheels 55 and 56 relative to the body 52 may be of any known type although the invention, which deals primarily with a vehicle body reinforcing arrangement, has primary utility with those suspension systems employing strut type systems.

Figure 4:
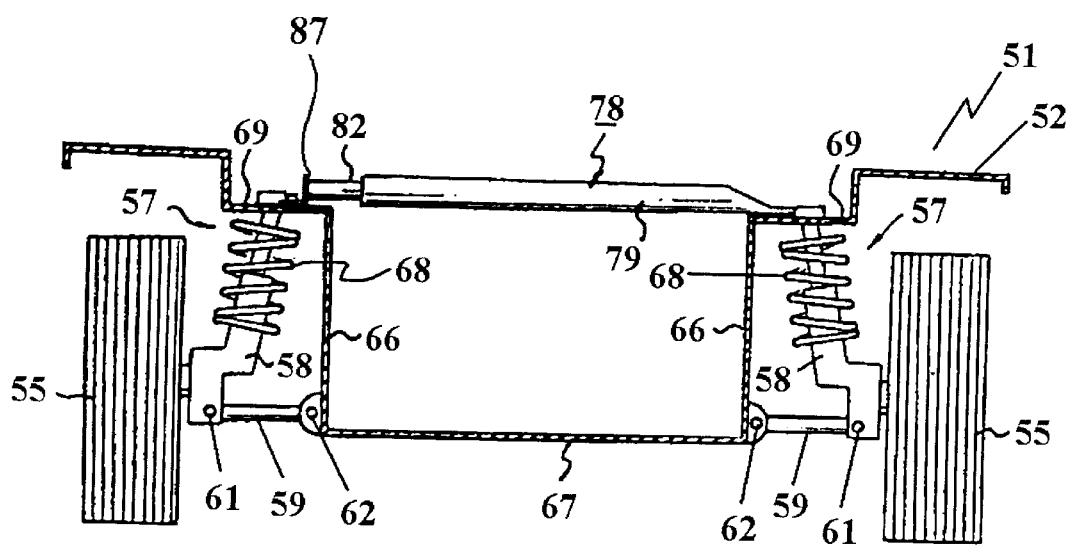
FIG. 4 is a cross sectional view taken along the line 4—4 of FIG. 3.
Figure 5:
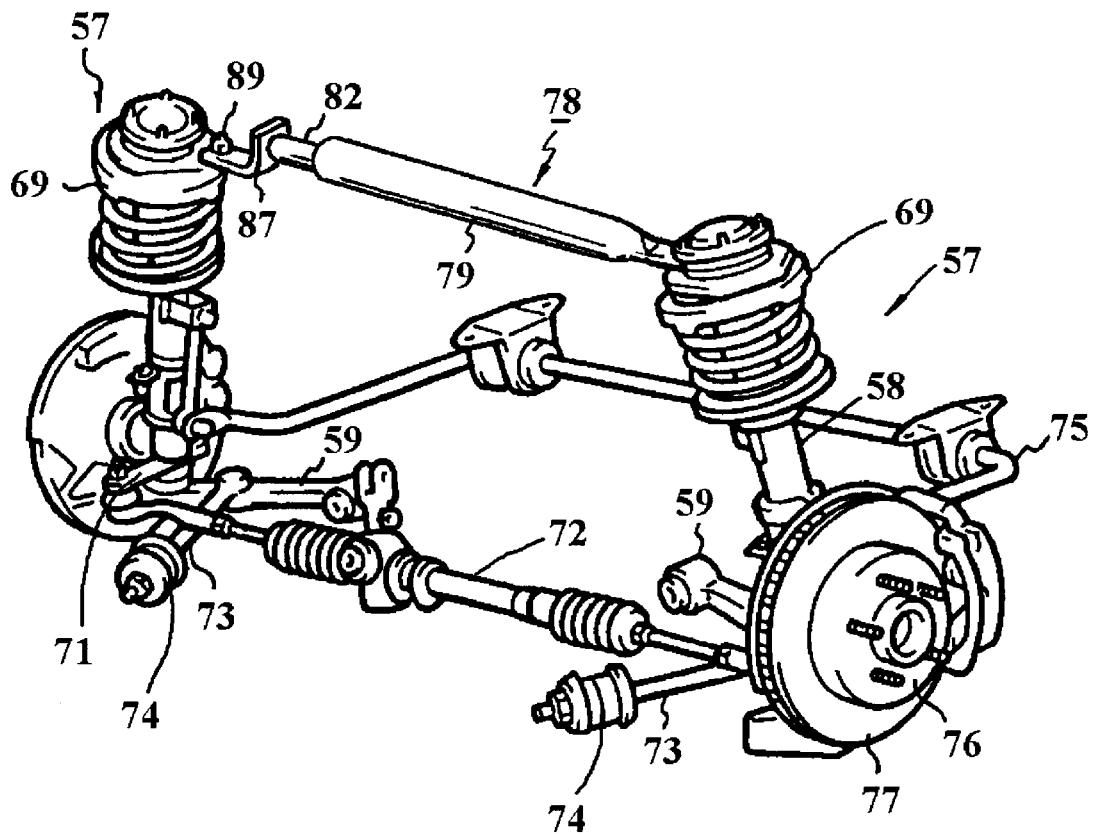
FIG. 5 is an enlarged perspective view showing further details of the front wheel suspension system of this vehicle.

This body reinforcing arrangement and its relationship to the vehicle body will now be described by reference to FIGS. 4 and 5, that show primarily the suspension system for the front wheels 55. As has been noted, however, the suspension system for the rear wheels 56 may be the same except that a steering mechanism for steering the rear wheels 56 is not necessary.

Each front suspension unit is indicated generally by the reference numeral 57 and each includes a strut member 58, which is pivotally journalled at the outer end of a respective lower arm 59 by means of a pivotal connection such as a spherical joint 61. The inner end of each of the suspension arms 59 is pivotally connected by means of a pivot joint 62 to one of a pair of spaced apart vertically extending walls 66 of the body frame 52 which walls are joined by a lower wall 67.

Each strut 58 is comprised of a tubular shock absorber and a surrounding coil compression spring 68. The upper ends of the struts 58 are pivotally connected to a horizontally extending wall portion 69 or reinforcing element of the body frame 52. As may be seen in FIG. 5, steering arms 71 are joined with the struts 58 and are connected to a steering linkage assembly 72 which may be of any known type. In addition, fore and aft locating arms 73 are connected to the lower arms 58 and also to the body frame 52 through elastic isolators 74 as is well known in this art.

An anti-roll or sway bar 75 may be interconnected between the struts 58 so as to reduce or control body roll.

The front wheels 55 are mounted on hubs 76 which are, in turn, connected to discs 77 of a disc brake assembly, which is not shown in detail.

The suspension systems 57 as thus far described may be considered to be conventional and, for that reason, further description of them is not believed to be necessary to permit those skilled in the art to practice the invention.

Figure 6:
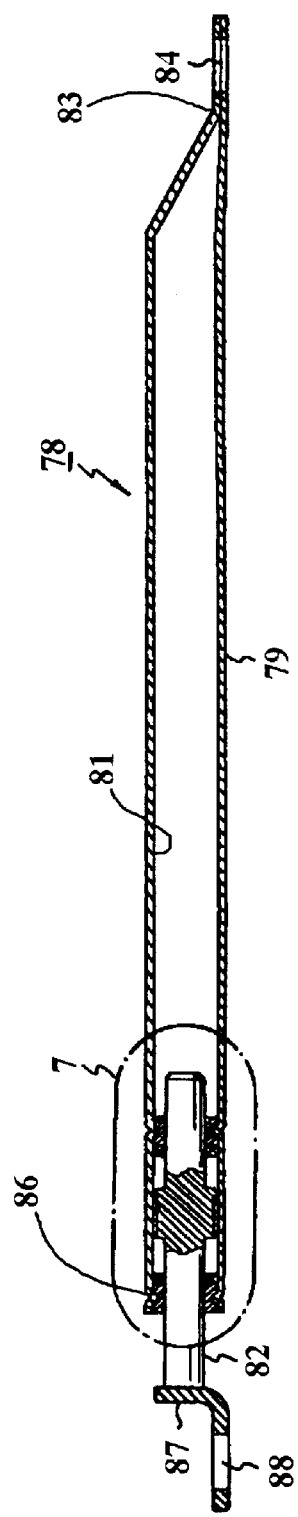
FIG. 6 is an enlarged cross sectional view showing the reinforcing member in accordance with this embodiment.
Figure 7:
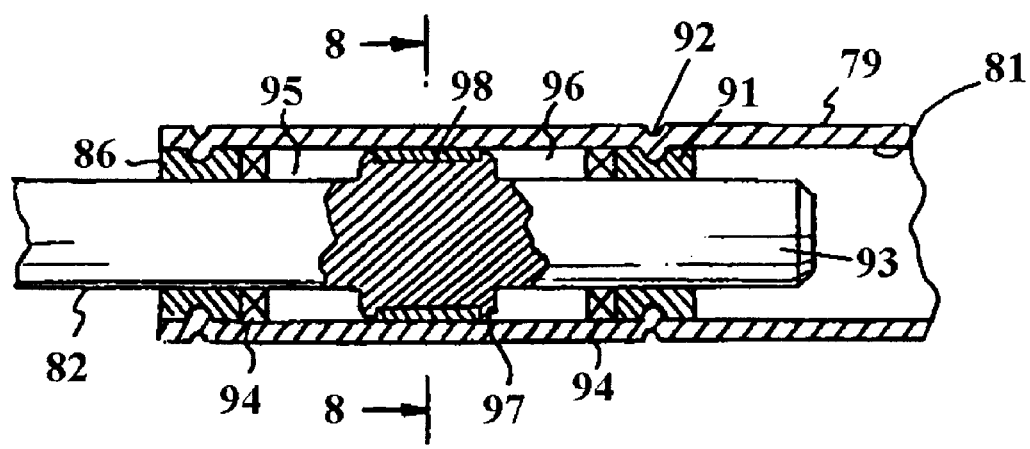
FIG. 7 is a further enlarged view of the area of the cross section encompassed by the circle 7 in FIG. 6.
Figure 8:
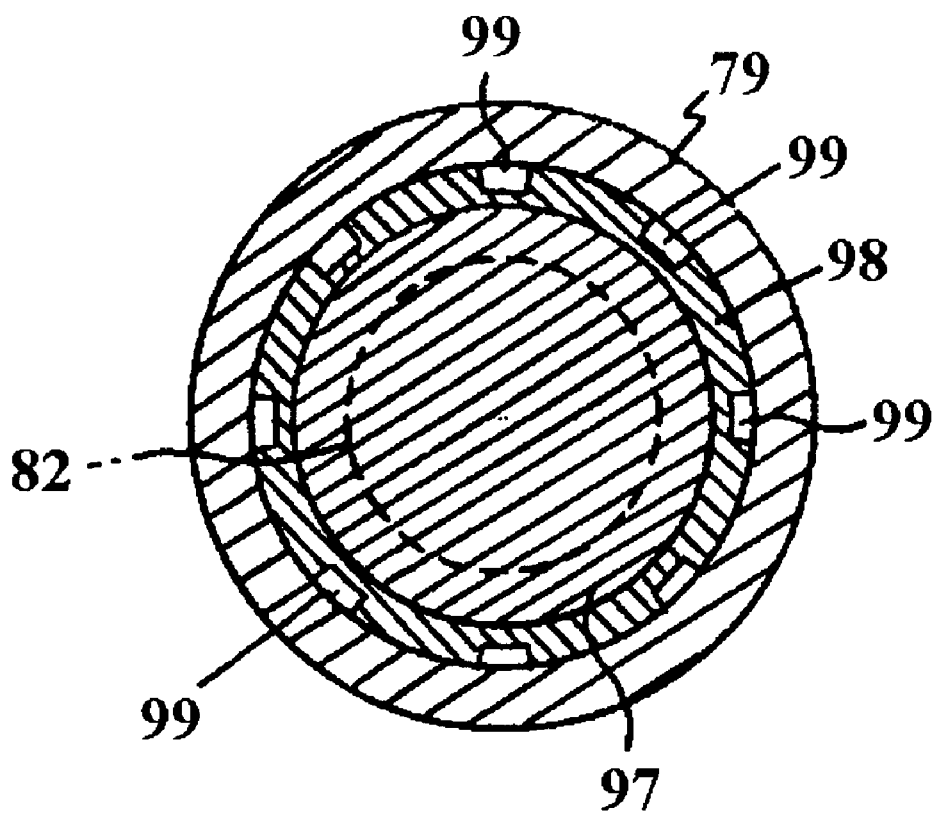
FIG. 8 is a cross sectional view taken along the line 8—8 of FIG. 7.

In accordance with the invention, a reinforcing member, indicated generally by the reference numeral 78, is associated with the body reinforcing parts 69 associated with both the front and rear wheels 55 and 56. The construction of this reinforcing member 78 and its connection to the body reinforcing parts 69 will now be described in more detail by reference to FIG. 6 although portions of this assembly appear in the other figures.

First, at one end the reinforcing member 78 is formed with a generally cylindrical body part 79 that defines a cylindrical chamber 81 in which a piston rod 82 is supported for reciprocation in a manner, which will be described. At one end, the body member 79 is flattened so as to provide a mounting flange 83, which has an opening 84 so as to receive a fastener for affixing it relative to the strut 58 at one side of the vehicle, this fastener being indicated by the reference numeral 85 in FIG. 3.

The piston rod 82 has an extending portion that extends through a seal 86 formed at the open end of the chamber 81. An L-shaped bracket 87 is affixed to this exposed end of the piston rod 82 and defines an opening 88 that receives a threaded fastener 89 (FIGS. 3 & 5) for affixing it to the body reinforcing part 69 at this side of the body frame assembly 52.

It should be noted that the piston rod 82 is telescopically received in the chamber 81 so that the housing member 79 and piston rod 82 are capable of relative axial movement to each other. As seen in these figures, this relative movement is viscously damped by an arrangement, which will now be described in detail.

In addition to the end seal 86, a further seal 91 is held in the chamber 81 of the cylindrical member 79 by means of crimped portion 92. The piston rod 82 has a portion 93 that extends through this seal 91 in sealing relationship. In addition, a pair of oil seals 94 are provided adjacent the inner sides of the seals 86 and 91 so each provides an oil seal at the outer ends of two chambers 95 and 96 formed on opposite sides of an enlarged portion 97 of the piston rod 82.

A piston ring 98 is received in a groove formed in the outer periphery of the enlarged portion 97 and cooperates to seal the chambers 95 and 96 from each other except for the formation of a plurality of circumferentially spaced flow orifices 99 formed in the periphery of the piston ring 98 which are sized so as to provide the appropriate damping characteristics for damping the relatively axial movement of the piston rod 82 relative to the cylinder member 79. Hence, rather than providing a rigid connection between the two body attachments as in the prior art, this structure provides elastic viscous damping in the form of hydraulic damping to control the relative movement and to avoid back shocks from being generated through successive compressions and expansions of the previously used rigid reinforcing members. As a result, this arrangement provides very good reinforcing without vibration induction and possible wear and adverse effects caused thereby. Also, since the axially forces on the reinforcing members 78 are reduced, this member can be made lighter in overall assembly then with the previously proposed construction.

Also, it would be possible to employ valved flow passages rather than the open passages 99 as are commonly used in shock absorbers so as to provide different damping in one direction from the other.

Figure 9:
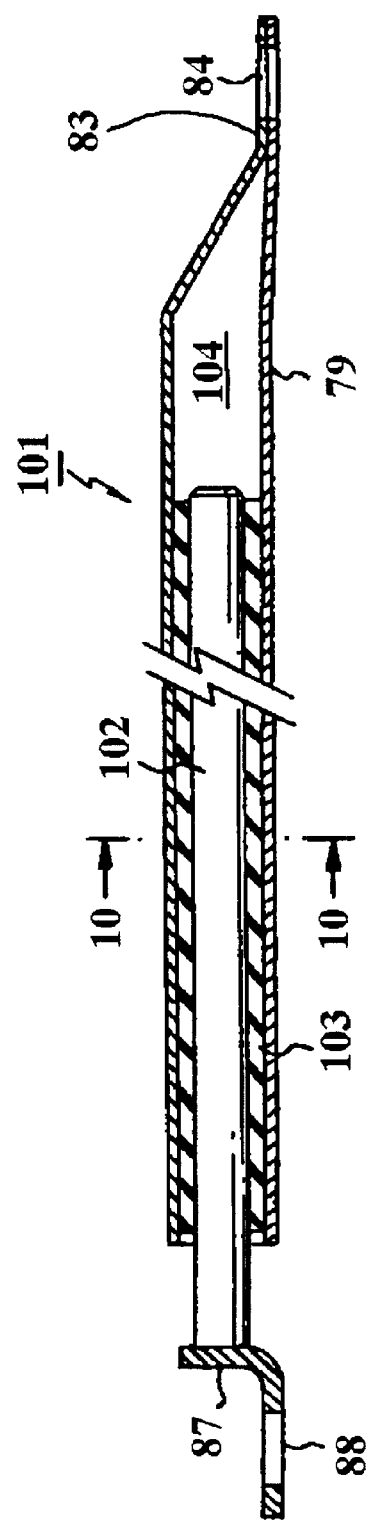
FIG. 9 is a cross sectional view, in part similar to FIG. 6, and shows a second embodiment of the invention.
Figure 10:
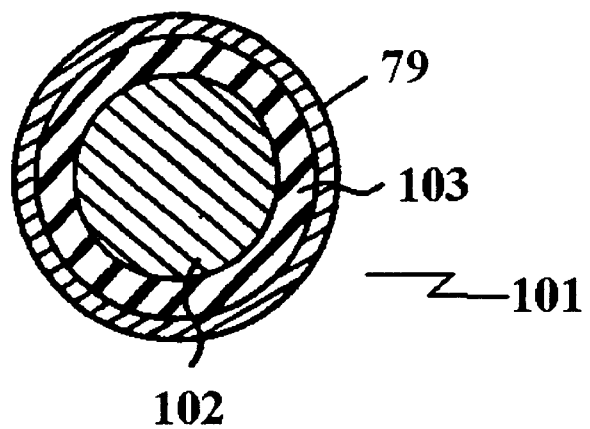
FIG. 10 is a cross sectional view taken along the line 10—10 of FIG. 9.

A second embodiment of the invention is illustrated in FIGS. 9 and 10 and is indicated generally by the reference numeral 101. This embodiment is attached to the vehicle body in the same manner as previously described and, therefore, further description of the body attachment is not believed to be necessary to permit those skilled in the art to practice the invention.

Also, in this embodiment the reinforcing member 101 has a cylindrical part which is the same as that of the previously described embodiment, except for the elimination of the oil seals and thus, the same reference numeral 79 has been utilized to identify this cylinder component and the same numbers are applied to its attaching arrangement for attachment to the vehicle body.

In this embodiment, there is also provided a piston rod, indicated generally by the reference numeral 102 which extends into the cylinder 81 and which is connected to the body by an attaching bracket 87 of the type previously described. Therefore, the same references numerals have been employed to identify this portion of the structure. In this embodiment, the viscous axial damping is provided by a viscous elastomeric or viscoelastic member, indicated generally by the reference numeral 103. This member is a cylindrical member that is adhesively bonded to the piston rod 102 and to the cylindrical body 79 and will provide damping.

However, this connection is such that it can be broken free in the excessive stress as occurs when the vehicle is involved in a major accident. Thus, it will absorb some of the shock but will break free so as to permit the body to crush and further absorb the impact. With this embodiment, the damping in one direction relative to the other can be different because of the fact that there is an air chamber, indicated generally by the reference numeral 104 that is formed at one end of the chamber 81 and which has its volume decreased on movement in one direction and increased on movement in the other direction.

Figure 11:
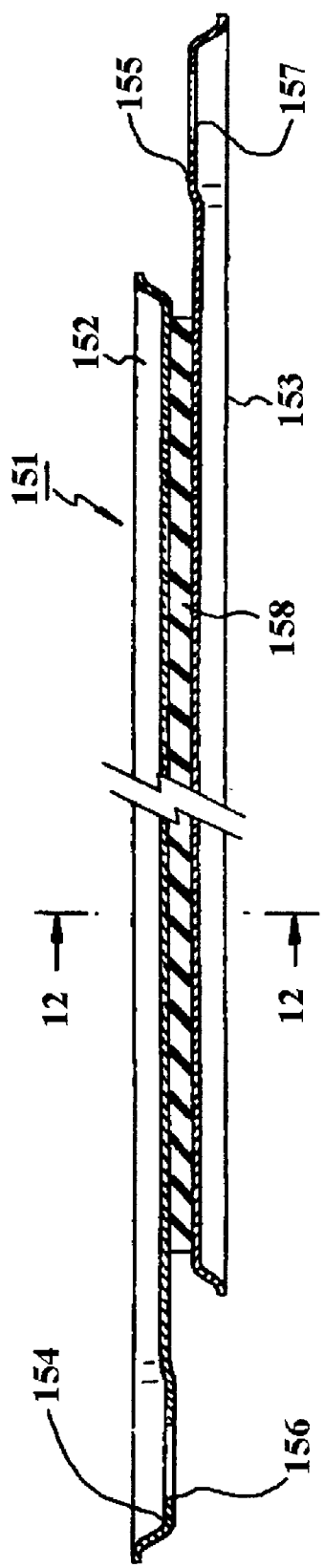
FIG. 11 is a cross sectional view, in part similar to FIGS. 6 and 9, and shows a third embodiment of the invention.
Figure 12:
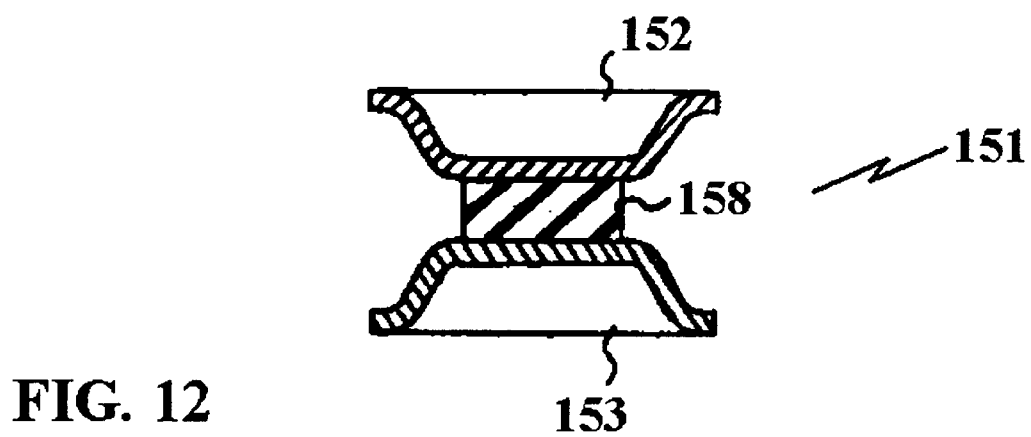
FIG. 12 is a cross sectional view taken along the line 12—12 of FIG. 11.

FIGS. 11 and 12 show a third embodiment of the invention, which is similar to the embodiment of FIGS. 9 and 10, however in this embodiment the damping basically is the same in each direction unless the unit is pre-loaded. The reinforcing member in this embodiment is indicated generally by the reference numeral 151 and includes a pair of plate like members 152 and 153, each of which has a respective end portion 154 and 155 defining openings 156 and 157 for attachment to the vehicle body. A viscoelastic or elastomeric plate 158 is adhesively bonded to the plate members 152 and 153 and provides the damping in this embodiment. Again, this embodiment provides the brake away protection as with the embodiment of FIGS. 10 and 11.

Figure 13:
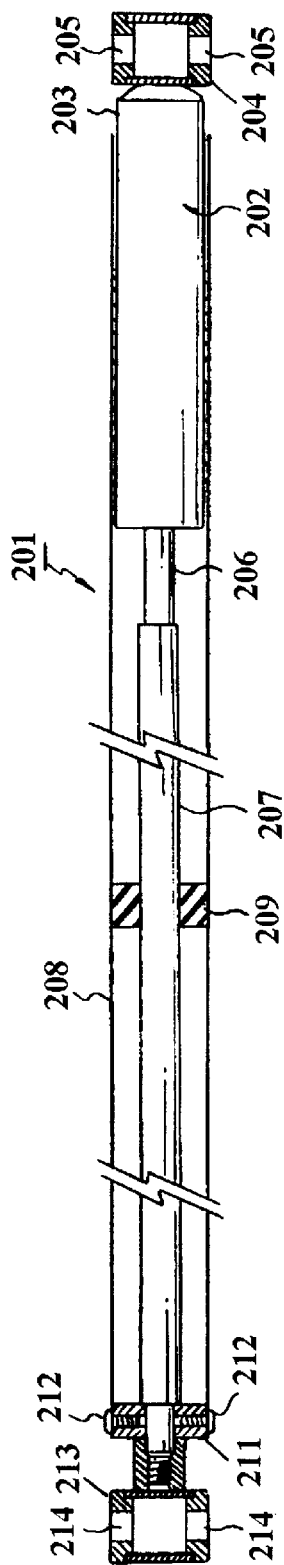
FIG. 13 is a cross sectional view, in part similar to FIGS. 6, 9 and 11, and shows a fourth embodiment of the invention.
Figure 14:
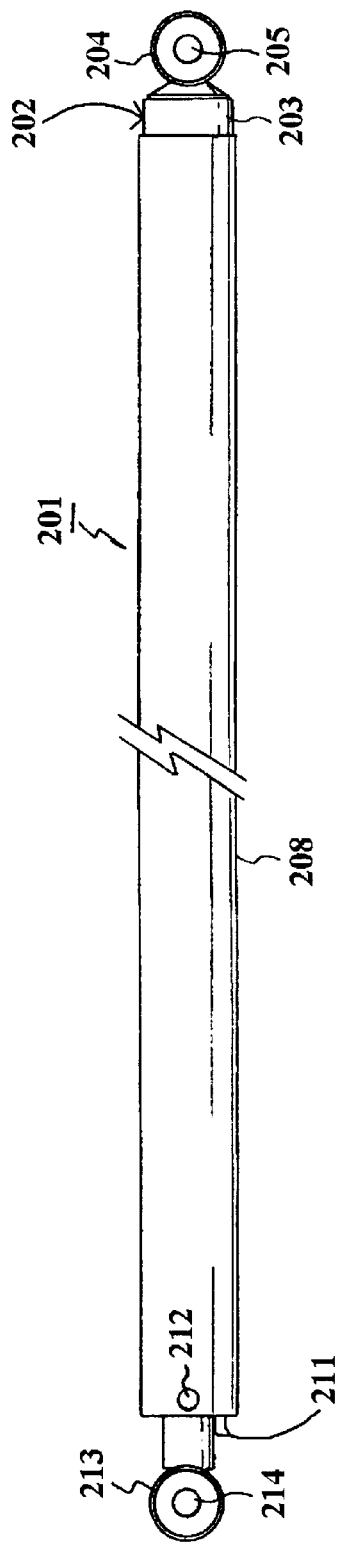
FIG. 14 is a top plan view of this embodiment.
Figure 15:
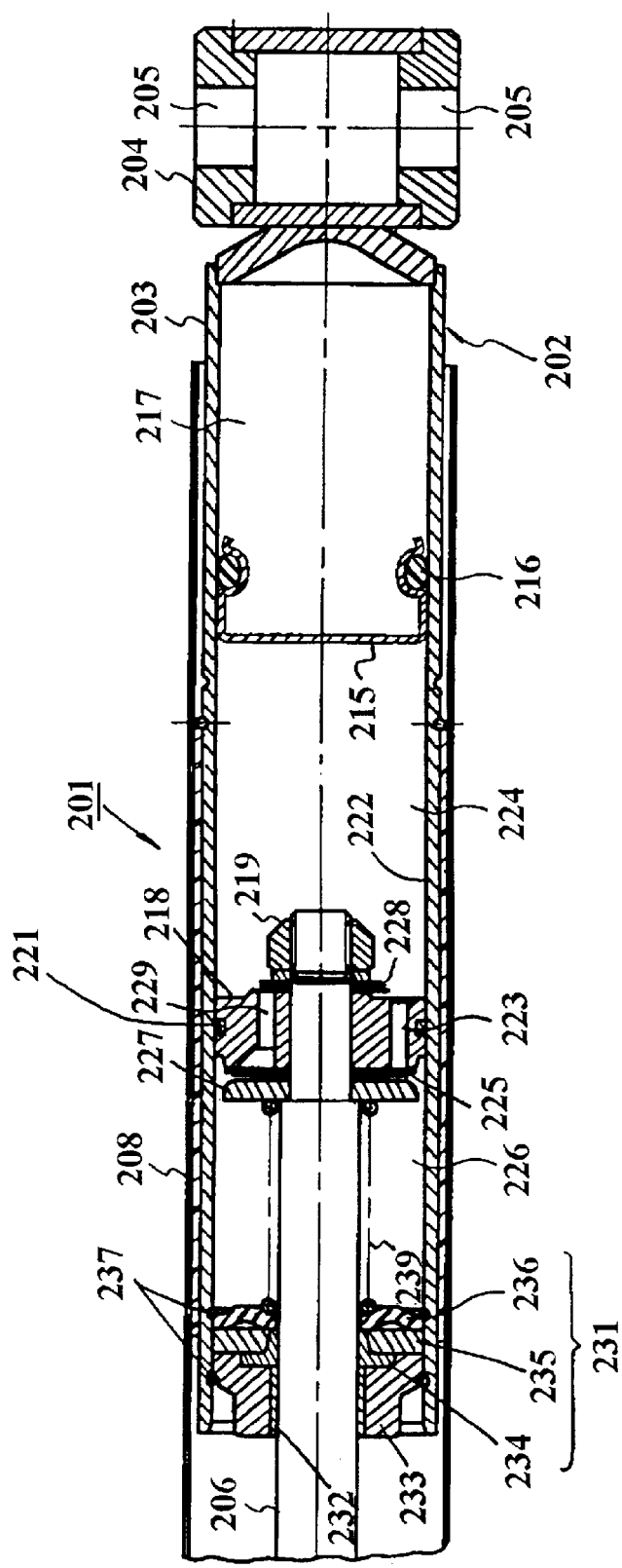
FIG. 15 is enlarged cross sectional view of the hydraulic damper of this embodiment.

FIGS. 13–15 show another embodiment of reinforcing member, indicated generally by the reference numeral 201 which provides the viscous damping by means of a hydraulic shock absorber, indicated generally by the reference numeral 202 and which may be of the type conventionally used in an automotive suspension system. This shock absorber 202 includes an outer cylinder member 203 that carries a mounting trunion 204 at one end thereof that has a pair of elastomeric closures that define openings 205 to pass a fastener in a manner, which will be described.

A piston rod 206 extends outwardly from beyond the cylinder member 203 and in a conventional automotive application would carry a trunion for connection to either a vehicle body element or a vehicle suspension system element. In this case, however, a tubular extension sleeve 207 is rigidly affixed to the piston rod 206 and extends through an outer cylinder 208, which surrounds and is suitably affixed to the cylinder 203 of the shock absorber 202. This extension rod 207 and tube 208 are required because the length of the reinforcing member 201 is greater than that of a normal shock absorber.

The extension rod 207 is supported intermediate its ends and generally centrally of the tube 208 by means of an elastic sleeve 209. A coupling member 211 is fixed to the end of the tube 208 by means of threaded fasteners 212. The coupling member 211 also has a trunion arrangement 213 that has a pair of elastic sleeves defining openings 214 for connection to the vehicle body in a manner, embodiments of which will be described shortly.

The internal structure of the shock absorber 202 will now be described by particular reference to FIG. 15. The shock absorber cylinder 203 defines an inner cylindrical bore in which a floating accumulator piston 215 is supported within an pressure seal of the O-ring type 216 contained in its outer periphery. This defines an accumulator chamber that is charged with an inner gas under pressure as indicated at 217. The piston rod 206 of the shock absorber carries a shock-absorbing piston 218 that is held thereon by a nut 219.

The piston 218 carries an O-ring seal 221 for sealing engagement with the cylinder bore 222 of the cylinder member 203. A first series of flow passages 223 permit flow from a first chamber 224 formed between the piston 218 and the floating piston 215. A plate-type valve 225 controls the flow from the chamber 224 to a chamber 226 formed on the other side of the piston 218. This plate-type valve 225 is loaded by a stopper member 227 that is held against a shoulder on the piston rod 206.

A plate-type valve 228 controls the flow from the chamber 226 to the chamber 224 through a second series of flow passages 229. If desired, the damping in one direction can be different from the other in any of the well known ways.

The open end of the shock absorber cylinder 203 is closed by a closure assembly, indicated generally by the reference numeral 231 and which functions to provide a seal for the other end of the fluid chamber 226. This seal arrangement includes a plastic bushing 232 that is received within a rod guide 233. The rod guide 233, in turn, carries an oil seal 234, a gasket 235 and a rigid washer 236. These components are held in a stacked relationship be means of a pair of circle clips 237.

In a conventional shock absorber structure, the weight of the vehicle on the suspension element maintains the pressure in the accumulator chamber 217. Since the reinforcing member 201, however, carries none of the vehicle weight, a pre-load coil spring 239 is contained within the chamber 226 and acts against the stopper member 227 to urge the piston to the right and maintain the desired pressure in the accumulator chamber 217.

As is well known in the shock absorber art, the volume of the accumulator chamber 217 will vary as the piston 218 moves axially within the cylinder bore 222 to accommodate changes in volume between the chambers 224 and 226 caused by the fact that the piston rod 206 only extends through the chamber 226.

Figure 16:
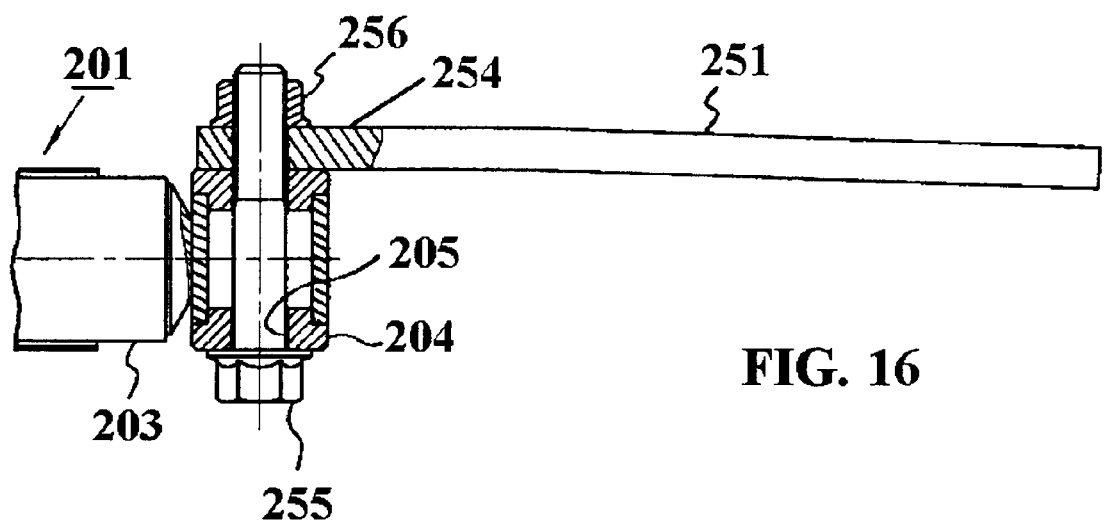
FIG. 16 is an enlarged view, with a portion broke away, showing one way in which the embodiment of FIGS. 13–15 can be mounted on the vehicle structure.
Figure 17:
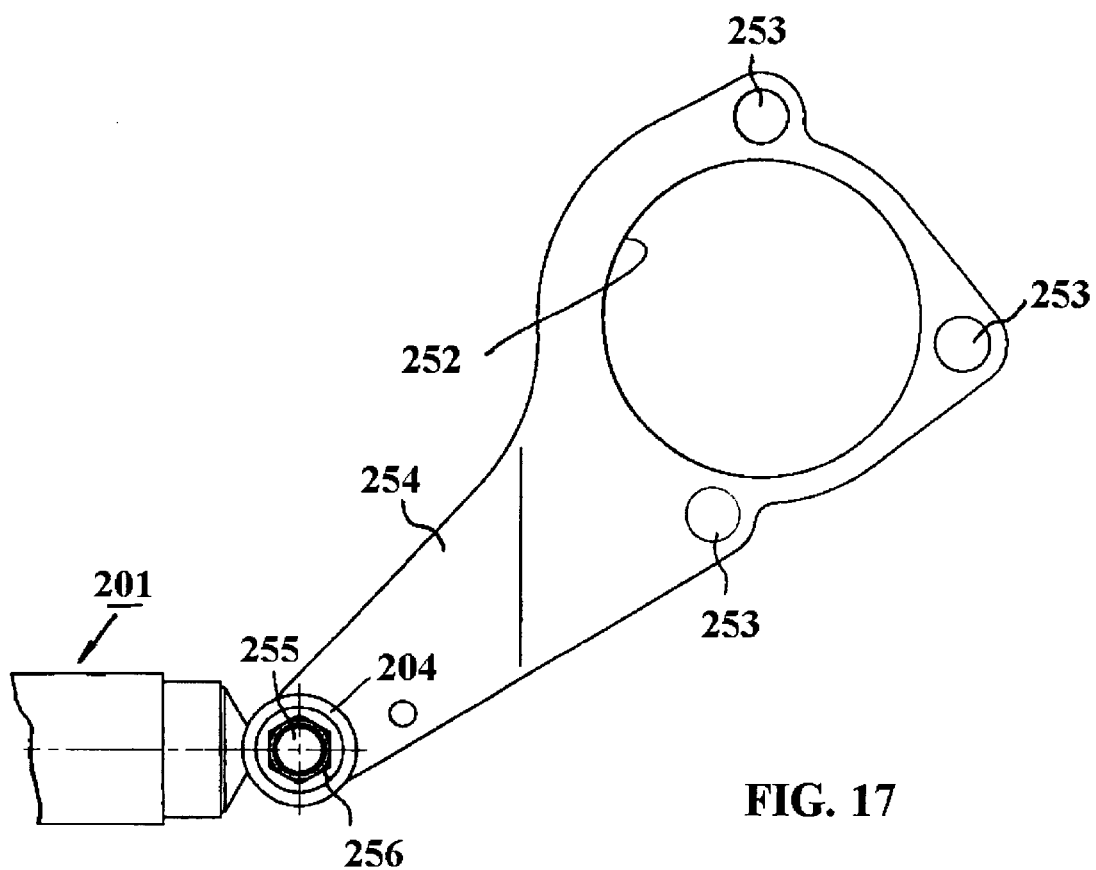
FIG. 17 is a top plan view of the arrangement shown in FIG. 16.

FIGS. 16 and 17 show one type of end connection that can be used with the damper shown in the embodiment of FIGS. 13–15. The embodiment of FIGS. 16 and 17 shows preferably the type of mounting that can be utilized to the strut assembly and this includes a mounting plate 251 which has an opening 252 sized to surround the upper end of the strut and be directly attached to the body reinforcing member 69 through fasteners passed through fastener openings 253 formed around the central opening 252. An arm portion 254 has an opening that permits a bolt 255 to pass through it and through the openings 205 in the trunion 204. A nut 256 completes this attachment.

Figure 18:
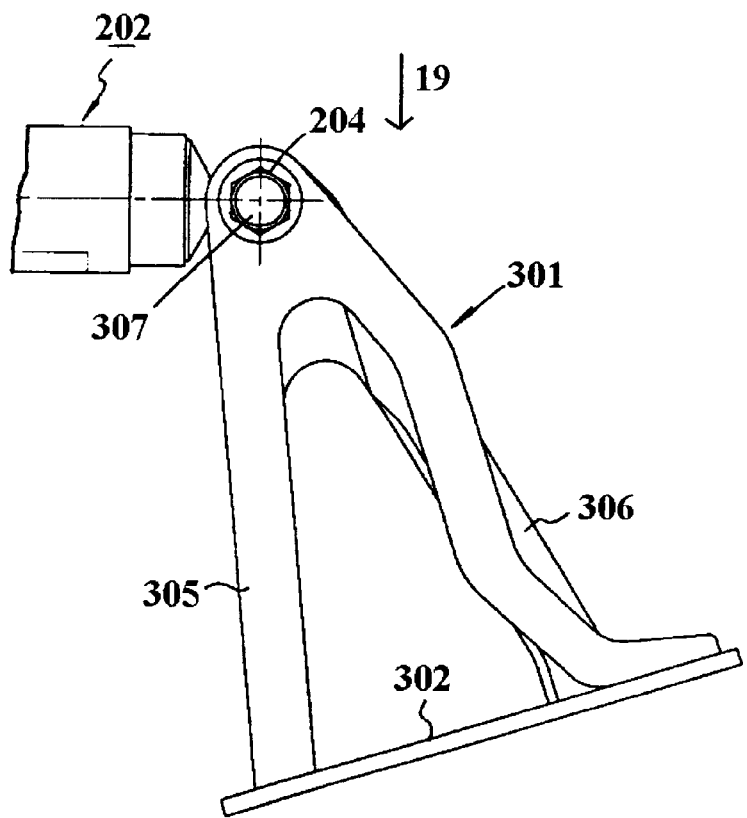
FIG. 18 is a top plan view, in part similar to FIG. 17, showing another way in which the embodiment of FIGS. 13–15 may be mounted on the vehicle body structure.
Figure 19:
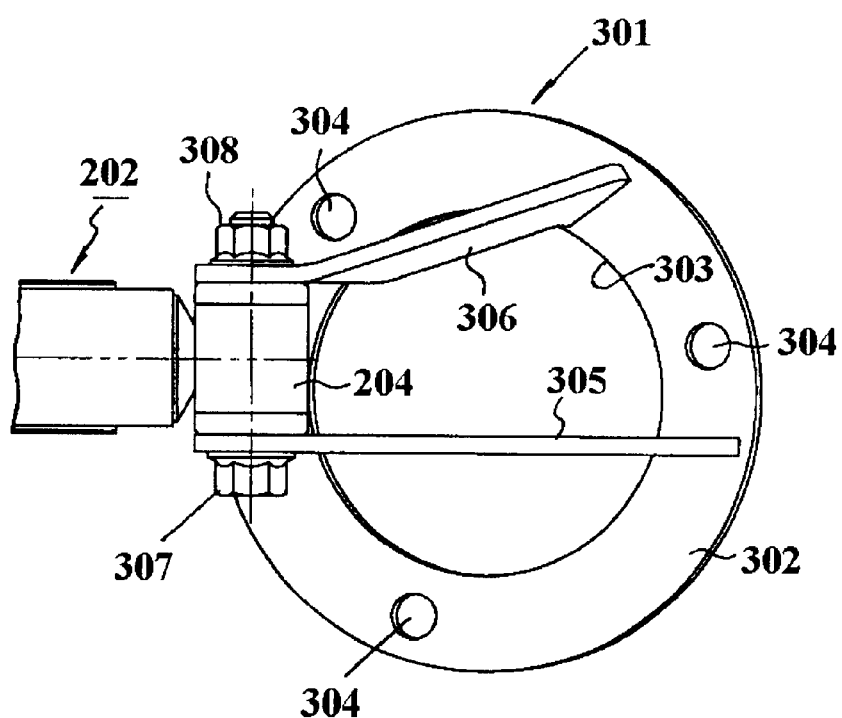
FIG. 19 is a view looking in the direction of the arrow 19 in FIG. 18.

FIGS. 18 and 19 show another type of attachment mechanism, which can be employed also. In this mechanism, there is provided a more sophisticated attachment arrangement attaching member, indicated generally by the reference numeral 301 which again has a mounting plate portion 302 that defines a central opening 303 to surround the strut. Fastener openings 304 encircle the central opening 303 and receive threaded fasteners (not shown) to affix the mounting assembly 301 to the vehicle body and specifically to the reinforcing member 69. A pair of upstanding arms 305 and 306 form openings through which a bolt 307 may pass to connect the trunion 204 of the reinforcing unit 202 to the vehicle body. A nut 308 completes this connection.

Thus, from the foregoing description it should be readily apparent that the disclosed reinforcing members are very effective in providing reinforcing for taking the loads of the suspension systems of an associated vehicle without having compression and expansion of the reinforcing member cause vibrations that can adversely effect the performance. Of course, the foregoing description is that of preferred embodiments of the invention and various changes and modifications may be made without departing from the sprit of the appended claims.

What is claimed is:

1. A vehicle having a vehicle body assembly, a ground engaging element for engaging the surface along which the vehicle passes, a suspension system for suspending said ground engaging element for suspension travel relative to said body assembly, a reinforcing member attached at one end to a reinforcing part of said vehicle body assembly to which said suspension system is affixed to receive forces transmitted to said reinforcing member and at another end to another part of said body assembly and to which a generally axial force is applied from said suspension system, and a damping system for generating a viscous damping force against said generally axial force on said reinforcing member.

2. A vehicle according to claim 1, wherein the two ends of the reinforcing member are moveable relative to each other in a generally axial direction and the damping system viscously dampens such relative movement.

3. A vehicle according to claim 2, wherein there is a second ground engaging element engaging the surface along which the vehicle passes, and a second suspension system for suspending said second ground engaging element for suspension travel relative to the body assembly and the other end of the reinforcing member is attached to a second reinforcing part of said body assembly to which said second suspension system is affixed.

4. A vehicle according to claim 2, wherein the viscous damping force is provided by a viscoelastic member.

5. A vehicle according to claim 4, wherein the viscoelastic member comprises an elastomeric member adhesively fixed to two portions of the reinforcing member.

6. A vehicle according to claim 5, wherein the elastomeric member has a cylindrical configuration and one reinforcing member portion is adhesively fixed to an inner bore thereof and the other reinforcing member portion is adhesively fixed to an outer surface thereof.

7. A vehicle according to claim 5, wherein the elastomeric member is an elongated planar member and one reinforcing member portion is adhesively fixed to one side thereof and the other reinforcing member portion is adhesively fixed to another side thereof.

8. A vehicle according to claim 1, wherein the damping system comprises a hydraulic damper for generating damping force by passing a liquid through an orifice.

9. A vehicle according to claim 8, wherein the damping force characteristics of the hydraulic damper are different in different directions of axial movement.

10. A vehicle according to claim 8, characterized in that the hydraulic damper comprises a cylinder, a piston mounted inside said cylinder and a piston rod extending outside of said cylinder from said piston, said piston forming two chambers on opposite sides of said piston in the cylinder, a gas chamber defined by a free piston and formed in said cylinder at one end of said piston, said two chambers being filled with liquid, orifices formed in said piston for communicating said two chambers with each other, and a gas charged in said gas chamber.

11. A vehicle according to claim 10, further including an axial force pre-load arrangement for preventing the pressure inside the gas chamber from axially pushing the piston rod out of the cylinder when no axial force is applied to either end of the hydraulic damper.

12. A vehicle according to claim 11, wherein the axial force pre-load arrangement comprises an elastic member for biasing the piston and piston rod in one direction.

13. A vehicle according to claim 8, wherein there is a second ground engaging element engaging the surface along which the vehicle passes, and a second suspension system for suspending said second ground engaging element for suspension travel relative to the body assembly and the other end of the reinforcing member is attached to a second reinforcing part of said body assembly to which said second suspension system is affixed.

* * * * *